US011308359B1

(12) United States Patent
Jeong et al.

(10) Patent No.: US 11,308,359 B1
(45) Date of Patent: Apr. 19, 2022

(54) METHODS FOR TRAINING UNIVERSAL DISCRIMINATOR CAPABLE OF DETERMINING DEGREES OF DE-IDENTIFICATION FOR IMAGES AND OBFUSCATION NETWORK CAPABLE OF OBFUSCATING IMAGES AND TRAINING DEVICES USING THE SAME

(71) Applicant: DEEPING SOURCE INC., Seoul (KR)

(72) Inventors: Jong Hu Jeong, Seoul (KR); Tae Hoon Kim, Seoul (KR)

(73) Assignee: DEEPING SOURCE INC., Seoul (KR)

( * ) Notice: Subject to any disclaimer, the term of this patent is extended or adjusted under 35 U.S.C. 154(b) by 0 days.

(21) Appl. No.: 17/511,908

(22) Filed: Oct. 27, 2021

(51) Int. Cl.
  *G06K 9/62* (2022.01)
  *G06N 3/04* (2006.01)
  *G06K 9/00* (2022.01)

(52) U.S. Cl.
  CPC ....... *G06K 9/6257* (2013.01); *G06K 9/00979* (2013.01); *G06K 9/6279* (2013.01); *G06N 3/0454* (2013.01)

(58) Field of Classification Search
  CPC ............. G06K 9/6257; G06K 9/00979; G06K 9/6279; G06N 3/0454
  See application file for complete search history.

(56) References Cited

U.S. PATENT DOCUMENTS

| 10,621,378 | B1* | 4/2020 | Kim | ................. G06N 20/00 |
| 10,621,379 | B1* | 4/2020 | Kim | ................. G06N 20/00 |
| 10,956,598 | B1* | 3/2021 | Lee | ................. G06F 21/6209 |
| 11,017,319 | B1* | 5/2021 | Kim | ................. G06N 20/00 |

(Continued)

OTHER PUBLICATIONS

Li, T., et al., "AnonymousNet: Natural Face De-Identification with Measurable Privacy," Proceedings of the IEEE/CVF Conference on Computer Vision and Pattern Recognition (CVPR) Workshops, Jun. 2019.*

*Primary Examiner* — Xuemei G Chen
(74) *Attorney, Agent, or Firm* — Amster, Rothstein & Ebenstein LLP

(57) ABSTRACT

Methods for training a universal discriminator and an obfuscation network are provided. The methods include steps of: generating an obfuscated image by obfuscating an original image through the obfuscation network, characteristic information by applying learning operation to the obfuscated image through a surrogate network, a first discriminant score determining a degree of de-identification for the obfuscated image through the universal discriminator, and a second discriminant score determining whether the obfuscated image is real or fake through a regular discriminator, and thus training the obfuscation network through minimizing an accuracy loss of the surrogate network, and maximizing the first and second discriminant scores, wherein the universal discriminator has been trained by classifying de-identified images into positive or negative samples according to degrees of de-identification, generating discriminant scores determining degrees of de-identification for the (Continued)

samples through the universal discriminator, and training the universal discriminator by minimizing discriminator losses of the discriminant scores.

22 Claims, 7 Drawing Sheets

(56) References Cited

U.S. PATENT DOCUMENTS

| | | | | |
|---|---|---|---|---|
| 11,017,320 | B1* | 5/2021 | Kim | G06N 3/0454 |
| 11,023,777 | B1* | 6/2021 | Koo | G06N 20/00 |
| 11,164,046 | B1* | 11/2021 | Kim | G06N 3/08 |
| 2018/0052971 | A1* | 2/2018 | Hanina | A61B 5/4833 |
| 2019/0188830 | A1* | 6/2019 | Edwards | G06K 9/6215 |
| 2019/0392128 | A1* | 12/2019 | Conde | G06F 21/32 |
| 2020/0034520 | A1* | 1/2020 | Kim | G06N 3/0454 |
| 2020/0034565 | A1* | 1/2020 | Kim | G06F 21/6254 |
| 2020/0050962 | A1* | 2/2020 | Kim | G06N 20/00 |
| 2020/0097767 | A1* | 3/2020 | Perry | G06K 9/00604 |
| 2020/0202496 | A1* | 6/2020 | Kokura | G06T 3/4046 |
| 2020/0387995 | A1* | 12/2020 | Bucciarelli | H04W 4/14 |
| 2021/0034724 | A1* | 2/2021 | Fong | G06K 9/00348 |
| 2021/0051294 | A1* | 2/2021 | Roedel | G06T 5/002 |
| 2021/0056213 | A1* | 2/2021 | Lucy | G06F 3/04842 |
| 2021/0056405 | A1* | 2/2021 | Bradshaw | G06F 21/6254 |
| 2021/0075824 | A1* | 3/2021 | Ibrahim | H04L 63/1483 |
| 2021/0209344 | A1* | 7/2021 | Guo | G06K 9/00288 |
| 2021/0209388 | A1* | 7/2021 | Ciftci | G06K 9/00718 |
| 2021/0240851 | A1* | 8/2021 | Badalone | H04W 12/02 |
| 2021/0240853 | A1* | 8/2021 | Carlson | G16H 10/20 |
| 2021/0248268 | A1* | 8/2021 | Ardhanari | G16H 70/60 |
| 2021/0267491 | A1* | 9/2021 | Guibene | A61B 5/1116 |
| 2021/0304365 | A1* | 9/2021 | Bhattacharjee | H04N 19/136 |
| 2021/0357745 | A1* | 11/2021 | Wallis | G06N 3/04 |
| 2021/0358178 | A1* | 11/2021 | Staudigl | G06T 7/0002 |
| 2021/0374931 | A1* | 12/2021 | Kumar | G06N 5/04 |

* cited by examiner

METHODS FOR TRAINING UNIVERSAL DISCRIMINATOR CAPABLE OF DETERMINING DEGREES OF DE-IDENTIFICATION FOR IMAGES AND OBFUSCATION NETWORK CAPABLE OF OBFUSCATING IMAGES AND TRAINING DEVICES USING THE SAME

FIELD OF THE DISCLOSURE

The present disclosure relates to methods for training a universal discriminator capable of determining each degree of de-identification for each image and for training an obfuscation network capable of obfuscating images and training devices using the same; and more particularly, to the methods for (i) classifying de-identified images, generated by de-identifying original images, into positive samples and negative samples to thereby train the universal discriminator by using the positive samples and the negative samples such that the universal discriminator generates each of discriminant scores according to each degree of the de-identification for each of the positive samples and the negative samples, and (ii) training the obfuscation network by using the universal discriminator that has been trained, and the training devices using the same.

BACKGROUND OF THE DISCLOSURE

Big data include structured data conventionally used in corporate environments or public institutions, as well as previously unutilized unstructured or semi-structured data, such as e-commerce data, metadata, web log data, RFID (Radio Frequency Identification) data, sensor network data, social network data, data related to internet texts and documents, internet search indexing data, etc. Such data are generally referred to as the big data in the sense that their vast amounts are difficult to be handled by ordinary software tools and computer systems.

While the big data may not contain any particular meanings by themselves, they are used in various fields for creating new data or for making judgments or predictions, such as through a data pattern analysis using machine learning.

In recent years, reinforcements have been made to personal information protection laws such that it has become mandatory to obtain consents from data owners or delete any information capable of identifying individuals if one were to share or trade the big data. However, since it is practically impossible or difficult to check every data included in the vast amount of the big data for any personal information or receive consent from the data owners, various de-identification technologies are emerging to support use of the big data.

As an example of a related prior art, a technique is disclosed in Korean Patent Registration No. 1861520. According to this technique, a face de-identification method is provided which includes a detection step of detecting a facial region of a person in an input image to be transformed, a first de-identification step of transforming the detected facial region into a distorted first image that does not have a facial shape of the person so that the person in the input image is prevented from being identified, and a second de-identification step of generating a second image having a contrasting facial shape based on the first image, and replacing the first image with the second image, in the input image, where the second image is generated to have a facial shape different from that of the facial region detected in the detection step.

Various deep-learning based de-identification technologies, including the de-identification technique described above, are being developed, but the data that requires de-identification have also been diversified in terms of their types and usages. This, in turn, has also diversified target objects, such as faces, body parts, texts, articles, etc., that requires the de-identification, and also increased the amount of data needed to be de-identified. Consequently, in the process of de-identifying a large amount of data obtained from various sources, the likelihood of failing to find out some personal information during a de-identification process or only partially de-identifying the personal information has given rise to an increased risk of the personal information being leaked.

Therefore, in order to determine whether the personal information has been successfully de-identified for each of de-identified data to thereby increase the performance of a deep-learning network capable of performing the de-identification, it is necessary to develop a method for determining each degree of the de-identification for each of the de-identified data.

Further, for maximizing the performance of the de-identification carried out by the deep-learning network capable of performing the de-identification, an effective training method making use of the degree of the de-identification determined for each of the de-identified data is desired.

Therefore, an enhanced method for solving the aforementioned problems is required.

SUMMARY OF THE DISCLOSURE

It is an object of the present disclosure to solve all the aforementioned problems.

It is another object of the present disclosure to generate a universal discriminator capable of producing discriminant scores corresponding to images inputted thereto according to each degree of de-identification for each of the images.

It is still another object of the present disclosure to train an obfuscation network capable of obfuscating the images by using the universal discriminator capable of determining each degree of the de-identification for each of the images.

It is still yet another object of the present disclosure to train the universal discriminator by using both successfully de-identified images and unsuccessfully de-identified images as training images, wherein the successfully de-identified images and the unsuccessfully de-identified images are generated by applying various de-identification technologies to original images.

In accordance with one aspect of the present disclosure, there is provided a method for training a universal discriminator capable of determining each degree of de-identification for each image, including steps of: (a) a learning device performing or supporting another device to perform processes of (i) transmitting de-identified images to at least one labeler, wherein the de-identified images are generated by de-identifying original images, and (ii) allowing the labeler to classify the de-identified images into positive samples or negative samples according to each degree of the de-identification for each of the de-identified images, wherein a positive reference value is labelled as ground truth for the positive samples and a negative reference value is labelled as ground truth for the negative samples; (b) the learning device performing or supporting another device to perform processes of inputting each of the positive samples and each of the negative samples to the universal discriminator, and allowing the universal discriminator to generate each of discriminant scores corresponding to each of the positive samples and each of the negative samples according to each degree of the de-identification for each of the positive samples and each of the negative samples; and (c) the learning device performing or supporting another device to perform processes of generating discriminator losses by comparing the discriminant scores for each of the positive samples and each of the negative samples with their corresponding ground truths, and thus training the universal discriminator in a direction of minimizing the discriminator losses.

As one example, at the step of (a), the de-identified images include anonymized images generated by applying at least one anonymization process, including at least one of blurring, noise addition, resolution changes, color changes and mosaic processing, to the original images.

As another example, at the step of (a), the de-identified images include obfuscated images generated by an obfuscation network in a training state or an obfuscation network in a trained state, wherein the obfuscation network in the training state and the obfuscation network in the trained state obfuscate each of the original images such that each of the obfuscated images is made not identifiable as each of its corresponding original images with naked eyes but is made identifiable as each of its corresponding original images by a deep-learning based surrogate network.

As another example, at the step of (a), the learning device performs or supports another device to perform processes of allowing the labeler to compare each degree of the de-identification for each of the de-identified images with one or more predetermined de-identification criteria, wherein at least one of a predetermined noise level, a predetermined entropy level or a possibility of detecting objects acts as the predetermined de-identification criteria, and thus allowing the labeler to (i) classify first certain de-identified images as the positive samples if first certain degrees of de-identification for the first certain de-identified images satisfy the predetermined de-identification criteria, and (ii) classify second certain de-identified images as the negative samples if second certain degrees of de-identification for the second certain de-identified images do not satisfy the predetermined de-identification criteria.

As another example, the learning device performs or supports another device to perform processes of allowing the labeler to (i) acquire each specific noise level for each of the de-identified images as each degree of the de-identification for each of the de-identified images and classify the first certain de-identified images, whose specific noise levels are higher than or equal to the predetermined noise level, as the positive samples, (ii) acquire each specific entropy level for each of the de-identified images as each degree of the de-identification for each of the de-identified images and classify the first certain de-identified images, whose specific entropy levels are higher than or equal to the predetermined entropy level, as the positive samples, and (iii) acquire each specific object detection result for each of the de-identified images as each degree of the de-identification for each of the de-identified images in order to determine the possibility of detecting objects, and classify the first certain de-identified images, whose specific object detection results show no objects detected, as the positive samples.

In accordance with another aspect of the present disclosure, there is provided a method for training an obfuscation network capable of obfuscating images, including steps of: (a) in response to acquiring a first original image, a first learning device performing or supporting another device to perform processes of inputting the first original image to an obfuscation network, and allowing the obfuscation network to obfuscate the first original image to thereby generate a first obfuscated image corresponding to the first original image; (b) the first learning device performing or supporting another device to perform processes of (i) (i-1) inputting the first obfuscated image into a surrogate network having at least one or more trained parameters, and allowing the surrogate network to apply at least one learning operation to the first obfuscated image by using the trained parameters and thus to generate characteristic information corresponding to the first obfuscated image, and (i-2) generating an accuracy loss by referring to the characteristic information and its corresponding ground truth or by referring to a specific task output and its corresponding ground truth, wherein the task specific output is generated by using the characteristic information, (ii) inputting the first obfuscated image to a universal discriminator, having been trained by a second learning device such that the universal discriminator generates discriminant scores corresponding to images inputted thereto according to each degree of de-identification for each of the images, and allowing the universal discriminator to generate a first discriminant score corresponding to the first obfuscated image according to a degree of the de-identification for the first obfuscated image, and (iii) inputting the first obfuscated image to a regular discriminator and allowing the regular discriminator to generate a second discriminant score corresponding to the first obfuscated image by determining whether the first obfuscated image is real or fake; and (c) the first learning device performing or supporting another device to perform processes of training the obfuscation network such that the accuracy loss is minimized and such that the first discriminant score and the second discriminant score are maximized.

As one example, while the first learning device performs or supports another device to perform the processes of training the obfuscation network such that the accuracy loss is minimized and the first discriminant score and the second discriminant score are maximized, the first learning device further performs or further supports another device to perform processes of (i) inputting the first obfuscated image to the regular discriminator and allowing the regular discriminator to generate the second discriminant score corresponding to the first obfuscated image by determining whether the first obfuscated image is real or fake, and (ii) (ii-1) inputting one of the first original image, a modified original image generated by modifying the first original image and a modified obfuscated image generated by modifying the first obfuscated image to the regular discriminator, (ii-2) allowing the regular discriminator to generate a third discriminant score corresponding to said one of the first original image, the modified original image and the modified obfuscated image by determining whether said one of the first original image, the modified original image the the modified obfuscated image is real or fake, and thus (ii-3) training the regular discriminator such that the second discriminant score is minimized and the third discriminant score is maximized.

As another example, the surrogate network includes a 1-st surrogate network to an n-th surrogate network respectively having one or more 1-st trained parameters to one or more n-th trained parameters wherein n is an integer equal to or larger than 1, and the first learning device performs or supports another device to perform processes of (i) inputting the first obfuscated image to each of the 1-st surrogate network to the n-th surrogate network and allows each of the 1-st surrogate network to the n-th surrogate network to apply its corresponding learning operation to the first obfuscated image by respectively using the 1-st trained parameters to the n-th trained parameters to thereby generate 1-st characteristic information to n-th characteristic information, and (ii) generating the accuracy loss by averaging a 1-st accuracy loss to an n-th accuracy loss, wherein each of the 1-st accuracy loss to the n-th accuracy loss is generated by referring to each of the 1-st characteristic information to the n-th characteristic information and its corresponding ground truth or by referring to each of a 1-st task specific output to an n-th task specific output, generated by using each of the 1-st characteristic information to the n-th characteristic information, and its corresponding ground truth.

As another example, the universal discriminator has been trained by the second learning device such that the universal discriminator generates the discriminant scores corresponding to the images inputted thereto according to each degree of the de-identification for each of the images, and wherein the second learning device performs or supports another device to perform processes of (i) transmitting de-identified images to at least one labeler and allowing the labeler to classify the de-identified images into positive samples or negative samples according to each degree of the de-identification for each of the de-identified images, wherein a positive reference value is labelled as ground truth for the positive samples and a negative reference value is labelled as ground truth for the negative samples, (ii) inputting each of the positive samples and each of the negative samples to the universal discriminator, and allowing the universal discriminator to generate each of 4-th discriminant scores corresponding to each of the positive samples and each of the negative samples according to each degree of the de-identification for each of the positive samples and each of the negative samples, and (iii) generating discriminator losses by comparing the 4-th discriminant scores for each of the positive samples and each of the negative samples with their corresponding ground truths, and thus training the universal discriminator such that the discriminator losses are minimized.

As another example, the de-identified images include anonymized images generated by applying at least one anonymization process, including at least one of blurring, noise addition, resolution changes, color changes and mosaic processing, to second original images, different from the first original image.

As another example, the de-identified images include second obfuscated images generated by an obfuscation network in a training state or an obfuscation network in a trained state, wherein the obfuscation network in the training state and the obfuscation network in the trained state obfuscate each of second original images, different from the first original image, such that each of the second obfuscated images is made not identifiable as each of its corresponding second original images with naked eyes but is made identifiable as each of its corresponding second original images by a deep-learning based surrogate network.

In accordance with still another aspect of the present disclosure, there is provided a learning device for training a universal discriminator capable of determining each degree of de-identification for each image, including: at least one memory that stores instructions; and at least one processor configured to execute the instructions to perform or support another device to perform: (I) processes of (i) transmitting de-identified images to at least one labeler, wherein the de-identified images are generated by de-identifying original images, and (ii) allowing the labeler to classify the de-identified images into positive samples or negative samples according to each degree of the de-identification for each of the de-identified images, wherein a positive reference value is labelled as ground truth for the positive samples and a negative reference value is labelled as ground truth for the negative samples, (II) processes of inputting each of the positive samples and each of the negative samples to the universal discriminator, and allowing the universal discriminator to generate each of discriminant scores corresponding to each of the positive samples and each of the negative samples according to each degree of the de-identification for each of the positive samples and each of the negative samples, and (III) processes of generating discriminator losses by comparing the discriminant scores for each of the positive samples and each of the negative samples with their corresponding ground truths, and thus training the universal discriminator in a direction of minimizing the discriminator losses.

As one example, at the process of (I), the de-identified images include anonymized images generated by applying at least one anonymization process, including at least one of blurring, noise addition, resolution changes, color changes and mosaic processing, to the original images.

As another example, at the process of (I), the de-identified images include obfuscated images generated by an obfuscation network in a training state or an obfuscation network in a trained state, wherein the obfuscation network in the training state and the obfuscation network in the trained state obfuscate each of the original images such that each of the obfuscated images is made not identifiable as each of its corresponding original images with naked eyes but is made identifiable as each of its corresponding original images by a deep-learning based surrogate network.

As another example, at the process of (I), the processor performs or supports another device to perform a process of allowing the labeler to compare each degree of the de-identification for each of the de-identified images with one or more predetermined de-identification criteria, wherein at least one of a predetermined noise level, a predetermined entropy level or a possibility of detecting objects acts as the predetermined de-identification criteria, and thus allowing the labeler to (i) classify first certain de-identified images as the positive samples if first certain degrees of de-identification for the first certain de-identified images satisfy the predetermined de-identification criteria, and (ii) classify second certain de-identified images as the negative samples if second certain degrees of de-identification for the second certain de-identified images do not satisfy the predetermined de-identification criteria.

As another example, the processor performs or supports another device to perform processes of allowing the labeler to (i) acquire each specific noise level for each of the de-identified images as each degree of the de-identification for each of the de-identified images and classify the first certain de-identified images, whose specific noise levels are higher than or equal to the predetermined noise level, as the positive samples, (ii) acquire each specific entropy level for each of the de-identified images as each degree of the de-identification for each of the de-identified images and classify the first certain de-identified images, whose specific entropy levels are higher than or equal to the predetermined entropy level, as the positive samples, and (iii) acquire each specific object detection result for each of the de-identified images as each degree of the de-identification for each of the de-identified images in order to determine the possibility of detecting objects, and classify the first certain de-identified images, whose specific object detection results show no objects detected, as the positive samples.

In accordance with still yet another aspect of the present disclosure, there is provided a first learning device for training an obfuscation network capable of obfuscating images, including: at least one memory that stores instructions; and at least one processor configured to execute the instructions to perform or support another device to perform: (I) in response to acquiring a first original image, processes of inputting the first original image to an obfuscation network, and allowing the obfuscation network to obfuscate the first original image to thereby generate a first obfuscated image corresponding to the first original image, (II) processes of (i) (i-1) inputting the first obfuscated image into a surrogate network having at least one or more trained parameters, and allowing the surrogate network to apply at least one learning operation to the first obfuscated image by using the trained parameters and thus to generate characteristic information corresponding to the first obfuscated image, and (i-2) generating an accuracy loss by referring to the characteristic information and its corresponding ground truth or by referring to a specific task output and its corresponding ground truth, wherein the task specific output is generated by using the characteristic information, (ii) inputting the first obfuscated image to a universal discriminator, having been trained by a second learning device such that the universal discriminator generates discriminant scores corresponding to images inputted thereto according to each degree of de-identification for each of the images, and allowing the universal discriminator to generate a first discriminant score corresponding to the first obfuscated image according to a degree of the de-identification for the first obfuscated image, and (iii) inputting the first obfuscated image to a regular discriminator and allowing the regular discriminator to generate a second discriminant score corresponding to the first obfuscated image by determining whether the first obfuscated image is real or fake, and (III) processes of training the obfuscation network such that the accuracy loss is minimized and such that the first discriminant score and the second discriminant score are maximized.

As one example, while processor performs or supports another device to perform the processes of training the obfuscation network such that the accuracy loss is minimized and the first discriminant score and the second discriminant score are maximized, the processor further performs or further supports another device to perform processes of (i) inputting the first obfuscated image to the regular discriminator and allowing the regular discriminator to generate the second discriminant score corresponding to the first obfuscated image by determining whether the first obfuscated image is real or fake, and (ii) (ii-1) inputting one of the first original image, a modified original image generated by modifying the first original image and a modified obfuscated image generated by modifying the first obfuscated image to the regular discriminator, (ii-2) allowing the regular discriminator to generate a third discriminant score corresponding to said one of the first original image, the modified original image and the modified obfuscated image by determining whether said one of the first original image, the modified original image the the modified obfuscated image is real or fake, and thus (ii-3) training the regular discriminator such that the second discriminant score is minimized and the third discriminant score is maximized.

As another example, the surrogate network includes a 1-st surrogate network to an n-th surrogate network respectively having one or more 1-st trained parameters to one or more n-th trained parameters wherein n is an integer equal to or larger than 1, and the processor performs or supports another device to perform processes of (i) inputting the first obfuscated image to each of the 1-st surrogate network to the n-th surrogate network and allows each of the 1-st surrogate network to the n-th surrogate network to apply its corresponding learning operation to the first obfuscated image by respectively using the 1-st trained parameters to the n-th trained parameters to thereby generate 1-st characteristic information to n-th characteristic information, and (ii) generating the accuracy loss by averaging a 1-st accuracy loss to an n-th accuracy loss, wherein each of the 1-st accuracy loss to the n-th accuracy loss is generated by referring to each of the 1-st characteristic information to the n-th characteristic information and its corresponding ground truth or by referring to each of a 1-st task specific output to an n-th task specific output, generated by using each of the 1-st characteristic information to the n-th characteristic information, and its corresponding ground truth.

As another example, the universal discriminator has been trained by the second learning device such that the universal discriminator generates the discriminant scores corresponding to the images inputted thereto according to each degree of the de-identification for each of the images, and wherein the processor performs or supports another device to perform processes of (i) transmitting de-identified images to at least one labeler and allowing the labeler to classify the de-identified images into positive samples or negative samples according to each degree of the de-identification for each of the de-identified images, wherein a positive reference value is labelled as ground truth for the positive samples and a negative reference value is labelled as ground truth for the negative samples, (ii) inputting each of the positive samples and each of the negative samples to the universal discriminator, and allowing the universal discriminator to generate each of 4-th discriminant scores corresponding to each of the positive samples and each of the negative samples according to each degree of the de-identification for each of the positive samples and each of the negative samples, and (iii) generating discriminator losses by comparing the 4-th discriminant scores for each of the positive samples and each of the negative samples with their corresponding ground truths, and thus training the universal discriminator such that the discriminator losses are minimized.

As another example, the de-identified images include anonymized images generated by applying at least one anonymization process, including at least one of blurring, noise addition, resolution changes, color changes and mosaic processing, to second original images, different from the first original image.

As another example, the de-identified images include second obfuscated images generated by an obfuscation network in a training state or an obfuscation network in a trained state, wherein the obfuscation network in the training state and the obfuscation network in the trained state obfuscate each of second original images, different from the first original image, such that each of the second obfuscated images is made not identifiable as each of its corresponding second original images with naked eyes but is made identifiable as each of its corresponding second original images by a deep-learning based surrogate network.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings. The accompanying drawings used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
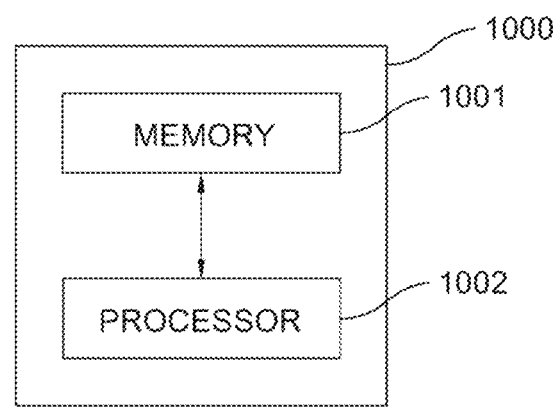
FIG. 1 is a drawing schematically illustrating a learning device for training a universal discriminator in accordance with one example embodiment of the present disclosure.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

The headings and abstract of the present disclosure provided herein are for convenience only and do not limit or interpret the scope or meaning of the embodiments.

As used in this specification and the appended claims, the singular forms "a," "an," and "the" may include plural referents unless the content and context clearly dictates otherwise.

To allow those skilled in the art to carry out the present disclosure easily, the example embodiments of the present disclosure will be explained by referring to attached diagrams in detail as shown below.

FIG. 1 is a drawing schematically illustrating a learning device 1000 for training a universal discriminator in accordance with one example embodiment of the present disclosure.

By referring to FIG. 1, the learning device 1000 may include a memory 1001 for storing instructions to be used for training the universal discriminator, and a processor 1002 for training the universal discriminator according to the instructions in the memory 1001.

Specifically, the learning device 1000 may achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, the case in which the computing device includes an integrated processor, integrating a medium, a processor and a memory, for implementing the present disclosure is not excluded.

A process of training the universal discriminator by using the learning device 1000 configured as explained above is described by referring to FIG. 2.

First, the learning device 1000 may perform or support another device to perform a process of transmitting de-identified images to at least one labeler, wherein the de-identified images are generated by de-identifying original images.

Then, the learning device 1000 may perform or support another device to perform a process of allowing the labeler to classify the de-identified images into positive samples or negative samples according to each degree of the de-identification for each of the de-identified images, wherein a positive reference value is labelled as ground truth for the positive samples and a negative reference value is labelled as ground truth for the negative samples.

Herein, the de-identified images may include anonymized images generated by applying at least one anonymization process, including at least one of blurring, noise addition, resolution changes, color changes and mosaic processing, to the original images.

Also, the de-identified images may include obfuscated images generated by an obfuscation network in a training state or an obfuscation network in a trained state, wherein the obfuscation network in the training state and the obfuscation network in the trained state obfuscate each of the original images such that each of the obfuscated images is made not identifiable as each of its corresponding original images with naked eyes but is made identifiable as each of its corresponding original images by a deep-learning based surrogate network. That is, the de-identified images may include the obfuscated images generated from an obfuscation network which applies an obfuscation function, whose training is ongoing or completed, to the original images. Herein, the obfuscation function may obfuscate the original images in such a way that the surrogate network performing specific tasks such as an object detection, a classification and the like is still able to identify information originally contained in the original images from the obfuscated images. Herein, the obfuscation network may perform noise superimpose on the original images by using the obfuscation function to destroy intrinsic colors, object edges and texture information of the original images.

However, the present disclosure is not limited thereto, and may include all types of the de-identified images that are generated from various algorithms to de-identify the original images.

Also, the positive reference value serving as the ground truth of the positive samples may be a reference value to indicate that each of the de-identified images classified as the positive samples is successfully de-identified, and may be of a score value "1". On the other hand, the negative reference value serving as the ground truth of the negative samples may be a reference value to indicate that each of the de-identified images classified as the negative samples is unsuccessfully de-identified, and may be of a score value "0".

Figure 2:
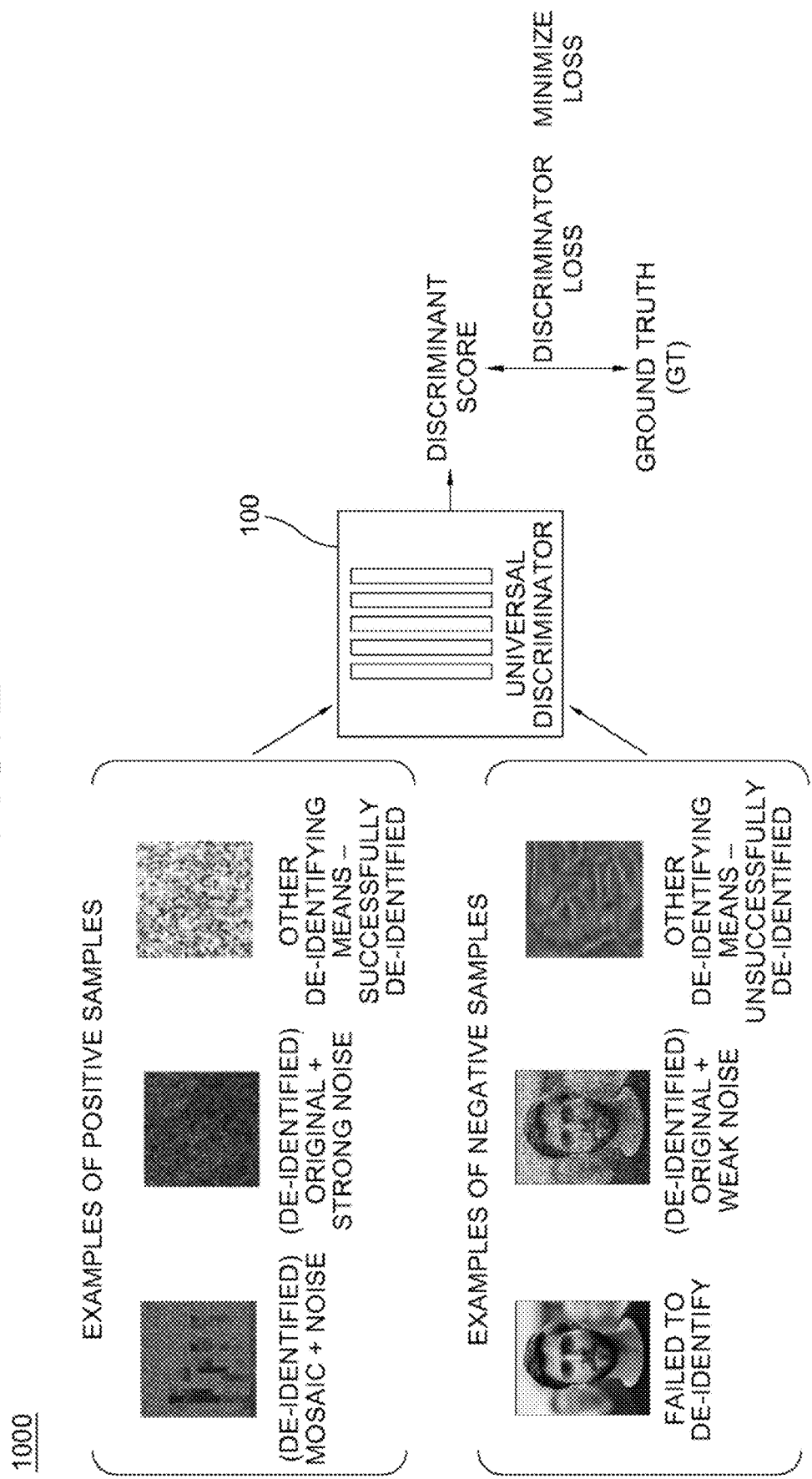
FIG. 2 is a drawing schematically illustrating a method for training the universal discriminator in accordance with one example embodiment of the present disclosure.

For example, as it can be seen from the examples of the positive samples shown on FIG. 2, the positive samples refer to those de-identified images that are successfully de-identified such that the original images from which the de-identified images are generated are not identifiable from the de-identified images themselves. As shown of FIG. 2, such positive samples may include at least one of (i) de-identified images whose corresponding original images are made un-identifiable therefrom by adding mosaics and noises to their corresponding original images, (ii) de-identified images whose corresponding original images are made un-identifiable therefrom by adding strong noises to their corresponding original images, (iii) de-identified images whose corresponding original images are made un-identifiable therefrom by completely de-identifying the entire region of their corresponding original images, and so on. However, the present disclosure is not limited thereto, and may include all types of the de-identified images whose corresponding original images are made un-identifiable therefrom by using various algorithms to de-identify the original images.

On the other hand, as it can be seen from the examples of the negative samples shown on FIG. 2, the negative samples refer to those de-identified images that are unsuccessfully de-identified such that the original images from which the de-identified images are generated are identifiable from the de-identified images themselves. As shown of FIG. 2, such negative samples may include at least one of (i) original images failed to be de-identified, (ii) de-identified images whose corresponding original images are identifiable therefrom as a result of only adding weak noises to their corresponding original images, (iii) de-identified images whose corresponding original images are identifiable therefrom as a result of an incomplete de-identification of their corresponding original images, and so on. However, the present disclosure is not limited thereto, and may include all types of the de-identified images whose corresponding original images are still identifiable therefrom despite using various algorithms to de-identify the original images.

Meanwhile, in order to classify the de-identified images acquired as above into the positive samples and the negative samples, the learning device 1000 may perform or support another device to perform processes of allowing the labeler to compare each degree of the de-identification for each of the de-identified images with one or more predetermined de-identification criteria, thereby allowing the labeler to (i) classify first certain de-identified images as the positive samples if first certain degrees of de-identification for the first certain de-identified images satisfy the predetermined de-identification criteria, and (ii) classify second certain de-identified images as the negative samples if second certain degrees of de-identification for the second certain de-identified images do not satisfy the predetermined de-identification criteria. Herein, at least one of a predetermined noise level, a predetermined entropy level or a possibility of detecting objects may act as the predetermined de-identification criteria.

In detail, the learning device 1000 may perform or support another device to perform a process of allowing the labeler to acquire each specific noise level for each of the de-identified images as each degree of the de-identification for each of the de-identified images and classify the first certain de-identified images, whose specific noise levels are higher than or equal to the predetermined noise level, as the positive samples. Herein, the each specific noise level for each of the de-identified images may represent numerical values of standard deviations generated by comparing signals of the de-identified images with signals of the original images, but the present disclosure is not limited thereto.

Instead, the learning device 1000 may perform or support another device to perform a process of allowing the labeler to acquire each specific entropy level for each of the de-identified images as each degree of the de-identification for each of the de-identified images and classify the first certain de-identified images, whose specific entropy levels are higher than or equal to the predetermined entropy level, as the positive samples.

Also instead, the learning device 1000 may perform or support another device to perform a process of allowing the labeler to acquire each specific object detection result for each of the de-identified images as each degree of the de-identification for each of the de-identified images in order to determine the possibility of detecting objects, and classify the first certain de-identified images, whose specific object detection results show no objects detected, as the positive samples.

Next, the learning device 1000 may perform or support another device to perform processes of inputting each of the positive samples and each of the negative samples classified by the labeler to the universal discriminator 100, and allowing the universal discriminator 100 to generate each of discriminant scores corresponding to each of the positive samples and each of the negative samples according to each degree of the de-identification for each of the positive samples and each of the negative samples. Herein, the discriminant scores corresponding to each of the positive samples and each of the negative samples may represent scores acquired as a result of determining whether each of the positive samples and each of the negative samples are sufficiently de-identified, and may range in between the negative reference value and the positive reference value. For example, the discriminant scores may be scores between "0" and "1".

Then, the learning device 1000 may perform or support another device to perform processes of generating discriminator losses by comparing the discriminator scores for each of the positive samples and each of the negative samples with their corresponding ground truths, and thus training the universal discriminator 100 in a direction of minimizing the discriminator losses.

That is, the training of the universal discriminator 100 enables images having discriminant scores larger than a preset value to be determined as sufficiently de-identified images, and images having discriminant scores smaller than the preset value to be determined as insufficiently de-identified images. Therefore, the universal discriminator 100 that has been trained may generate each of probabilities on how successfully each of inputted images is de-identified, and each of the probabilities may be used as a means to determine each degree of the de-identification for each of the inputted images.

Figure 4:
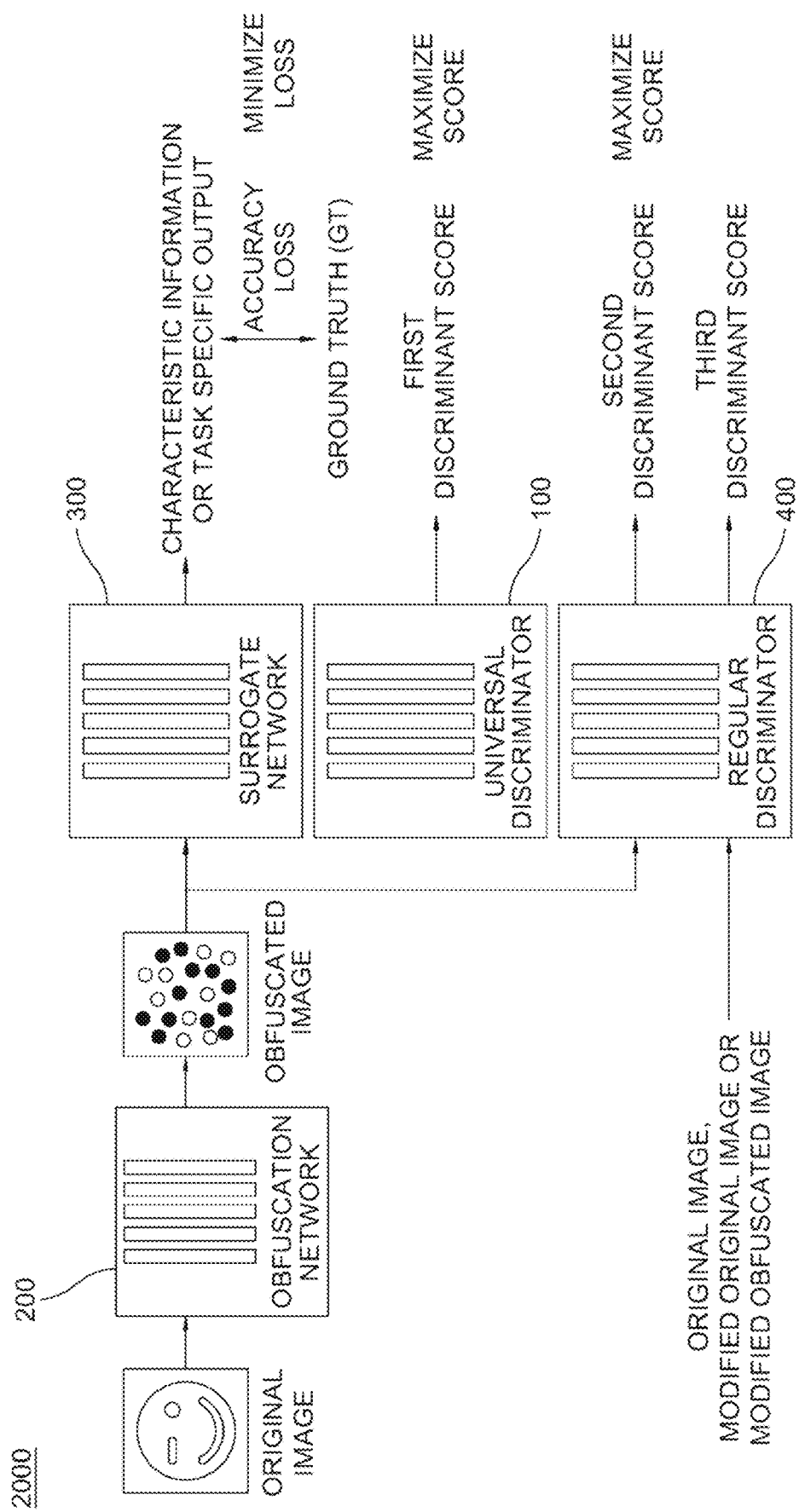
FIG. 4 is a drawing schematically illustrating a method for training the obfuscation network by using the universal discriminator in accordance with one example embodiment of the present disclosure.
Figure 5:
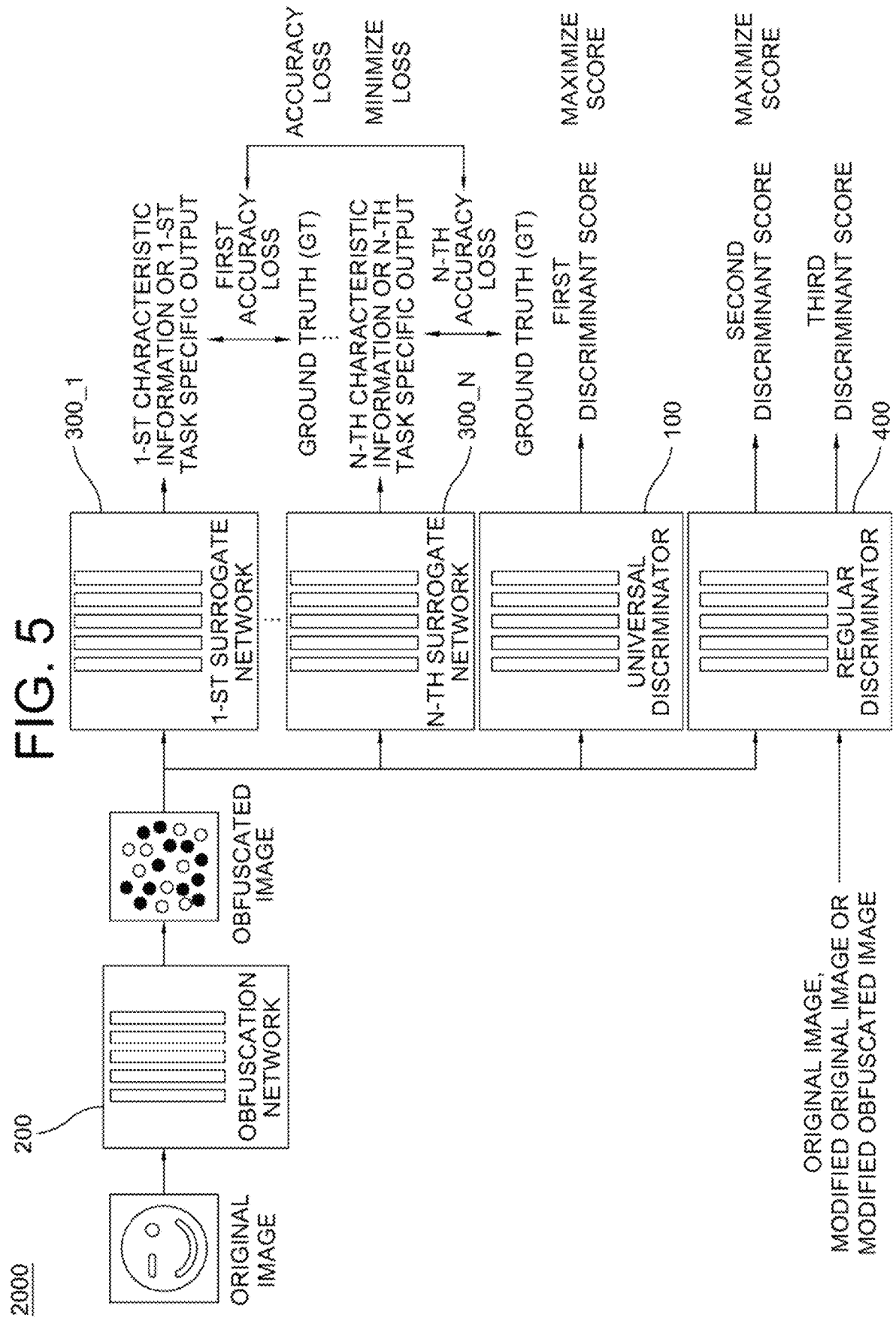
FIG. 5 is a drawing schematically illustrating another method for training the obfuscation network by using the universal discriminator in accordance with one example embodiment of the present disclosure.

Meanwhile, the universal discriminator 100 trained as described above may be used in a process of training a deep-learning based obfuscation network capable of performing obfuscation, to thereby improve the performance of the deep-learning based obfuscation network. Accordingly, FIGS. 3 to 5 are schematically illustrating a learning device 2000 for training the obfuscation network capable of obfuscating images by using the universal discriminator 100 trained as described above and methods using the same.

Figure 3:
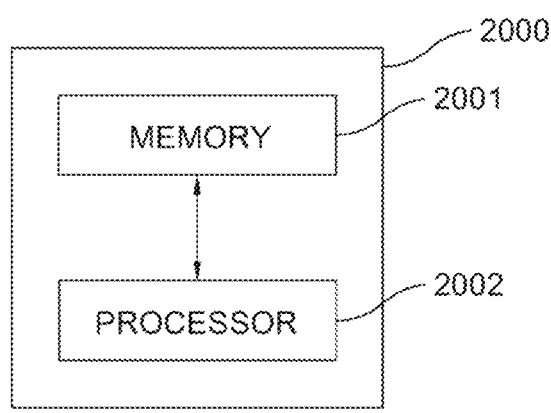
FIG. 3 is a drawing schematically illustrating a learning device for training an obfuscation network by using the universal discriminator in accordance with one example embodiment of the present disclosure.

FIG. 3 is a drawing schematically illustrating the learning device 2000 for training the obfuscation network by using the universal discriminator 100 in accordance with one example embodiment of the present disclosure.

By referring to FIG. 3, the learning device 2000 may include a memory 2001 for storing instructions to be used for training the obfuscation network, and a processor 2002 for training the obfuscation network according to the instructions in the memory 2001.

Specifically, the learning device 2000 may achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, the case in which the computing device includes an integrated processor, integrating a medium, a processor and a memory, for implementing the present disclosure is not excluded.

Meanwhile, the learning device 2000 for training the obfuscation network may be the same device as the learning device 1000 for training the universal discriminator or a different device from the learning device 1000 for training the universal discriminator.

A process of training the obfuscation network by using the learning device 2000 configured as explained above is described by referring to FIGS. 4 and 5.

FIG. 4 is a drawing schematically illustrating a method for training the obfuscation network 200 by using the universal discriminator 100 in accordance with one example embodiment of the present disclosure.

Herein, the obfuscation network in the training state or the obfuscation network in the trained state which generates the obfuscated images to be used as the de-identified images in the process of training the universal discriminator 100 as described in FIGS. 1 and 2 is a different obfuscation network from the obfuscation network 200 that is trained or to be trained by using the methods described in FIGS. 4 and 5.

By referring to FIG. 4, in response to acquiring an original image, the learning device 2000 may perform or support another device to perform processes of inputting the original image to the obfuscation network 200, and allowing the obfuscation network 200 to obfuscate the original image to thereby generate an obfuscated image corresponding to the original image. Herein, the original images used for training the obfuscation network 200 may be a different image from the original images corresponding to the de-identified images used during the process of training the universal discriminator 100.

Herein, the obfuscation network 200 may input the original image into an encoder including a plurality of convolutional layers to thereby generate a feature map corresponding to the original image, and then to input the feature map into a decoder including a plurality of deconvolutional layers to thereby generate the obfuscated image corresponding to the original image, but the structure of the obfuscation network 200 is not limited thereto.

Following, the learning device 2000 may perform or support another device to perform processes of inputting the obfuscated image into a surrogate network 300 having at least one or more trained parameters, and allowing the surrogate network 300 to apply at least one learning operation to the obfuscated image by using the trained parameters and thus to generate characteristic information corresponding to the obfuscated image. Then, the learning device 2000 may perform or support another device to perform a process of generating an accuracy loss by referring to the characteristic information and its corresponding ground truth or by referring to a specific task output and its corresponding ground truth, wherein the task specific output is generated by using the characteristic information.

Herein, the obfuscated image is unidentifiable by the naked eyes but is recognized to be the same as or similar to the original image by the surrogate network 300. Also, the surrogate network 300 capable of generating features or logits corresponding to the obfuscated image may be a surrogate network which has been pre-trained with original data and obfuscated data in order to predict analysis results yielded by neural networks to be trained with the obfuscated image generated from the obfuscation network 200, but the present disclosure is not limited thereto.

Herein, the surrogate network 300 may include a machine learning network, but the scope of the present disclosure is not limited thereto, and may include any learning networks capable of, using their own trained parameters, generating characteristic information by applying the learning operation to the obfuscated image. In addition, the machine learning network may include at least one of a k-Nearest Neighbors, a Linear Regression, a Logistic Regression, a Support Vector Machine (SVM), a Decision Tree and Random Forest, a Neural Network, a Clustering, a Visualization and a Dimensionality Reduction, an Association Rule Learning, a Deep Belief Network, a Reinforcement Learning, and a Deep learning algorithm, but the machine learning network is not limited thereto and may include various learning algorithms.

Additionally, the characteristic information may be features or logits respectively corresponding to the original image. Also, the characteristic information may be feature values related to certain features respectively in the original image, or the logits including values related to at least one of vectors, matrices, and coordinates related to the certain features. For example, if the original image is a facial image, the result above may be classes for face recognition, facial features, e.g., laughing expressions, coordinates of facial landmark points, e.g., both end points on far sides of an eye.

Meanwhile, the task specific output may be an output of a task to be performed by the surrogate network 300, and may have various results according to the task learned by the surrogate network 300, such as probabilities of classes, coordinates resulting from regression for location detection, etc., and an activation function of an activation unit may be applied to the characteristic information outputted from the surrogate network 300, to thereby generate the task specific output according to the task to be performed by the surrogate network 300. Herein, the activation function may include a sigmoid function, a linear function, a softmax function, an rlinear function, a square function, a sqrt function, an srlinear function, an abs function, a tan h function, a brlinear function, etc. but the scope of the present disclosure is not limited thereto.

As one example, when the surrogate network 300 performs the task for the classification, the learning device 2000 may map the characteristic information outputted from the surrogate network 300 onto each of classes, to thereby generate one or more probabilities of the obfuscated image, for each of the classes.

Herein, the probabilities for each of the classes may represent probabilities of the characteristic information, outputted for each of the classes from the surrogate network 300, being correct. For example, if the original image is the facial image, a probability of the face having a laughing expression may be outputted as 0.75, and a probability of the face not having the laughing expression may be outputted as 0.25, and the like. Herein, a softmax algorithm may be used for mapping the characteristic information outputted from the surrogate network 300 onto each of the classes, but the scope of the present disclosure is not limited thereto, and various algorithms may be used for mapping the characteristic information onto each of the classes.

Next, the learning device 2000 may perform or support another device to perform a process of inputting the obfuscated image to the universal discriminator 100, having been trained by the learning device 1000 such that the universal discriminator 100 generates discriminant scores corresponding to images inputted thereto according to each degree of de-identification for each of the images, and allowing the universal discriminator 100 to generate a first discriminant score corresponding to the obfuscated image according to a degree of the de-identification for the obfuscated image.

Also, the learning device 2000 may perform or support another device to perform a process of inputting the obfuscated image to a regular discriminator 400 and allowing the regular discriminator 400 to generate a second discriminant score corresponding to the obfuscated image by determining whether the obfuscated image is real or fake.

Therefore, the learning device 2000 may perform or support another device to perform a process of training the obfuscation network 200 such that the accuracy loss is minimized and such that the first discriminant score and the second discriminant score are maximized. Herein, when the obfuscation network 200 is being trained, the learning device 2000 may fix, i.e., not update, the trained parameters of the surrogate network 300, and may proceed with training the obfuscation network 200 only.

While the learning device 2000 may perform or support another device to perform the processes of training the obfuscation network 200 such that the accuracy loss is minimized and the first discriminant score and the second discriminant score are maximized, the learning device 2000 may further perform or further support another device to perform processes of inputting one of the original image, a modified original image generated by modifying the original image and a modified obfuscated image generated by modifying the obfuscated image to the regular discriminator 400, and allowing the regular discriminator 400 to generate a third discriminant score corresponding to said one of the original image, the modified original image and the modified obfuscated image by determining whether said one of the original image, the modified original image the modified obfuscated image is real or fake. That is, one of the original image, the modified original image and the modified obfuscated image may be used as a target image for the obfuscated image that the obfuscation network 200 aims to generate.

Herein, a modification process for modifying the original image or the obfuscated image may include a method of adding random noise. In other words, the random noise generating network (not shown) may be instructed to generate the random noise having a normal distribution $N(0, \sigma)$, and the generated noise may be added to the original image or the obfuscated image, to thereby generate the modified original image or the modified obfuscated image. However, the scope of the present disclosure is not limited thereto, and various ways of modifying the original image and the obfuscated image may be used.

Subsequently, the learning device 2000 may perform or support another device to perform a process of training the regular discriminator 400 such that the second discriminant score is minimized and the third discriminant score is maximized. Herein, a maximum discriminant score generated by the regular discriminator 400 on an image inputted thereto may be a score value of "1" that judges the image inputted as real, and a minimum discriminant score may be a score value of "0" that judges the image inputted as fake.

Also, the learning device 2000 may repeat the training iteration as described above to train the obfuscation network 200.

Meanwhile, FIG. 5 is a drawing schematically illustrating another method for training the obfuscation network 200 by using the universal discriminator 100 in accordance with one example embodiment of the present disclosure.

By referring to FIG. 5, the surrogate network 300 as shown in FIG. 4 is configured as multiple surrogate networks 300_1, 300_2, . . . , and 300_n having their own trained parameters. Herein, each of the multiple surrogate networks 300_1, 300_2, . . . , and 300_n may be in a trained state to perform at least part of tasks that are different from each other. In the description below, parts easily deducible from the explanation of FIG. 4 are omitted.

By referring to FIG. 5, the surrogate network 300 may include the 1-st surrogate network 300_1 to the n-th surrogate network 300_n respectively having one or more 1-st trained parameters to one or more n-th trained parameters. Herein, n is an integer equal to or larger than 1.

In FIG. 5, the learning device 2000 may perform or support another device to perform processes of inputting the original image to the obfuscation network 200, and allowing the obfuscation network 200 to obfuscate the original image to thereby generate the obfuscated image corresponding to the original image. Herein, the original images used for training the obfuscation network 200 may be a different image from the original images corresponding to the de-identified images used during the process of training the universal discriminator 100.

Next, the learning device 200 may perform or support another device to perform processes of inputting the obfuscated image to each of the 1-st surrogate network 300_1 to the n-th surrogate network 300_n and allowing each of the 1-st surrogate network 300_1 to the n-th surrogate network 300_n to apply its corresponding learning operation to the obfuscated image by respectively using the 1-st trained parameters to the n-th trained parameters to thereby generate 1-st characteristic information to n-th characteristic information.

Then, the learning device 2000 may perform or support another device to perform processes of generating the accuracy loss by averaging a 1-st accuracy loss to an n-th accuracy loss, wherein each of the 1-st accuracy loss to the n-th accuracy loss is generated by referring to each of the 1-st characteristic information to the n-th characteristic information and its corresponding ground truth or by referring to each of a 1-st task specific output to an n-th task specific output, generated by using each of the 1-st characteristic information to the n-th characteristic information, and its corresponding ground truth.

Next, the learning device 2000 may perform or support another device to perform a process of inputting the obfuscated image to the universal discriminator 100, having been trained by the learning device 1000 such that the universal discriminator 100 generates discriminant scores corresponding to images inputted thereto according to each degree of de-identification for each of the images, and allowing the universal discriminator 100 to generate the first discriminant score corresponding to the obfuscated image according to the degree of the de-identification for the obfuscated image.

Also, the learning device 2000 may perform or support another device to perform a process of inputting the obfuscated image to the regular discriminator 400 and allowing the regular discriminator 400 to generate the second discriminant score corresponding to the obfuscated image by determining whether the obfuscated image is real or fake.

Therefore, the learning device 2000 may perform or support another device to perform a process of training the obfuscation network 200 such that the accuracy loss is minimized and such that the first discriminant score and the second discriminant score are maximized. Herein, when the obfuscation network 200 is being trained, the learning device 2000 may not update the trained parameters of the surrogate network 300, and may proceed with training the obfuscation network 200 only.

While the learning device 2000 may perform or support another device to perform the processes of training the obfuscation network 200 such that the accuracy loss is minimized and the first discriminant score and the second discriminant score are maximized, the learning device 2000 may further perform or further support another device to perform processes of inputting one of the original image, the modified original image generated by modifying the original image and the modified obfuscated image generated by modifying the obfuscated image to the regular discriminator 400, and allowing the regular discriminator 400 to generate the third discriminant score corresponding to said one of the original image, the modified original image and the modified obfuscated image by determining whether said one of the original image, the modified original image the modified obfuscated image is real or fake.

Subsequently, the learning device 2000 may perform or support another device to perform a process of training the regular discriminator 400 such that the second discriminant score is minimized and the third discriminant score is maximized. Herein, a maximum discriminant score generated by the regular discriminator 400 on an image inputted thereto may be a score value of "1" that judges the image inputted as real, and a minimum discriminant score may be a score value of "0" that judges the image inputted as fake.

Also, the learning device 2000 may repeat the training iteration as described above to train the obfuscation network 200.

Figure 6:
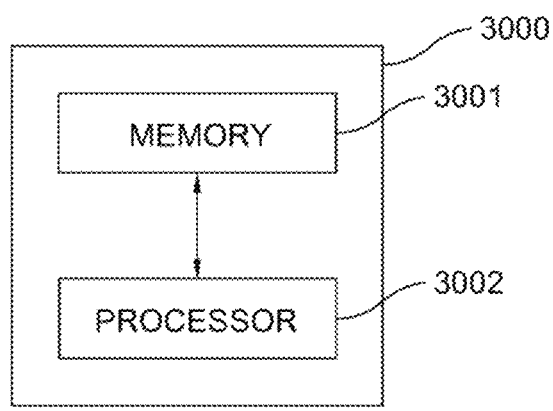
FIG. 6 is a drawing schematically illustrating a testing device for testing the obfuscation network in accordance with one example embodiment of the present disclosure.

FIG. 6 is a drawing schematically illustrating a testing device 3000 for testing the obfuscation network 200 in accordance with another example embodiment of the present disclosure.

By referring to FIG. 6, the testing device 3000 may include a memory 3001 storing instructions to be used for testing the obfuscation network 200, and a processor 3002 for testing the obfuscation network 200 according to the instructions in the memory 3001.

Specifically, the testing device 3000 may achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, the case in which the computing device includes an integrated processor, integrating a medium, a processor and a memory, for implementing the present disclosure is not excluded.

A process of testing the obfuscation network 200 by using the testing device 3000 configured as explained above is described by referring to FIG. 7.

Figure 7:
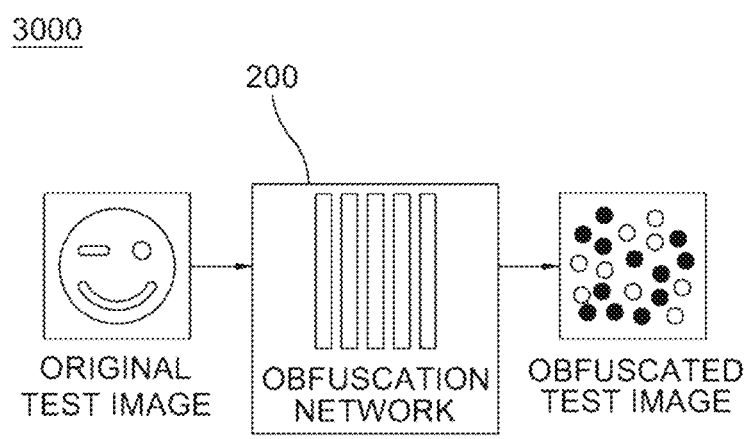
FIG. 7 is a drawing schematically illustrating a method for testing the obfuscation network in accordance with one example embodiment of the present disclosure.

FIG. 7 is a drawing schematically illustrating a method for testing the obfuscation network 200 in accordance with another example embodiment of the present disclosure. In the following description, detailed explanation of parts that can be easily understood from the description provided by referring to FIGS. 4 and 5 are omitted.

By referring to FIG. 7, on condition that the obfuscation network 200 has been trained according to the methods described in FIGS. 3 to 5, the testing device 3000 may perform or support another device to perform processes of inputting an original test image to the obfuscation network 200, and allowing the obfuscation network 200 to obfuscate the original test image to thereby generate an obfuscated test image corresponding to the original test image.

Herein, the obfuscated test image is unidentifiable by the naked eyes but is recognized to be the same as or similar to the original test image by the surrogate network 300.

Meanwhile, the obfuscated image generated in accordance with one example embodiment of the present disclosure may be provided or sold to a buyer of big data.

Also, in accordance with one example embodiment of the present disclosure, the buyer may execute program instructions recorded in computer readable media by using the computer devices, to thereby generate the obfuscated image from the original image owned by the buyer or acquired from other sources, and use the obfuscated image for his/her own neural networks.

The present disclosure has an effect of determining degrees of de-identification for de-identified images, produced from various de-identification methods, by using a universal discriminator, wherein the universal discriminator is capable of generating discriminant scores corresponding to images inputted thereto according to each degree of de-identification for each of the images.

The present disclosure has another effect of generating an additional loss during a process of training an obfuscation network by referring to discriminant scores generated from the universal discriminator on obfuscated images, to thereby improve the performance of the obfuscation network.

The present disclosure has still another effect of training the obfuscation network by using losses generated not only from the universal discriminator but also from a deep-learning based surrogate network and from a regular discriminator capable of determining whether images inputted thereto are real or fake, to thereby enable the obfuscation network to generate the obfuscated images that are not identifiable with naked eyes but identifiable by the deep-learning based surrogate network.

Besides, the embodiments of the present disclosure as explained above can be implemented in a form of executable program command through a variety of computer means recordable to computer readable media. The computer readable media may store solely or in combination, program commands, data files, and data structures. The program commands recorded in the media may be components specially designed for the present disclosure or may be usable for a skilled human in a field of computer software. The computer readable media include, but are not limited to, magnetic media such as hard drives, floppy diskettes, magnetic tapes, memory cards, solid-state drives, USB flash drives, optical media such as CD-ROM and DVD, magneto-optical media such as floptical diskettes and hardware devices such as a read-only memory (ROM), a random access memory (RAM), and a flash memory specially designed to store and carry out program commands. Program commands may include not only a machine language code made by a compiler but also a high level code that can be used by an interpreter etc., which is executed by a computer. The aforementioned hardware device may work as more than a software module to perform the action of the present disclosure and they may do the same in the opposite case. The hardware device may include a processor such as a CPU or a GPU, combined with a memory device such as ROM or RAM to store the program commands, configured to execute the commands stored in the memory, and a communication part which can exchange signals with external devices. In addition, the hardware device may include a keyboard, a mouse, and any other external input device to receive commands prepared by developers.

As seen above, the present disclosure has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for training a universal discriminator capable of determining each degree of de-identification for each image, comprising steps of:
   (a) a learning device performing or supporting another device to perform processes of (i) transmitting de-identified images to at least one labeler, wherein the de-identified images are generated by de-identifying original images, and (ii) allowing the labeler to classify the de-identified images into positive samples or negative samples according to each degree of the de-identification for each of the de-identified images, wherein a positive reference value is labelled as ground truth for the positive samples and a negative reference value is labelled as ground truth for the negative samples;
   (b) the learning device performing or supporting another device to perform processes of inputting each of the positive samples and each of the negative samples to the universal discriminator, and allowing the universal discriminator to generate each of discriminant scores corresponding to each of the positive samples and each of the negative samples according to each degree of the de-identification for each of the positive samples and each of the negative samples; and
   (c) the learning device performing or supporting another device to perform processes of generating discriminator losses by comparing the discriminant scores for each of the positive samples and each of the negative samples with their corresponding ground truths, and thus training the universal discriminator in a direction of minimizing the discriminator losses.

2. The method of claim 1, wherein, at the step of (a), the de-identified images include anonymized images generated by applying at least one anonymization process, including at least one of blurring, noise addition, resolution changes, color changes and mosaic processing, to the original images.

3. The method of claim 1, wherein, at the step of (a), the de-identified images include obfuscated images generated by an obfuscation network in a training state or an obfuscation network in a trained state, wherein the obfuscation network in the training state and the obfuscation network in the trained state obfuscate each of the original images such that each of the obfuscated images is made not identifiable as each of its corresponding original images with naked eyes but is made identifiable as each of its corresponding original images by a deep-learning based surrogate network.

4. The method of claim 1, wherein, at the step of (a), the learning device performs or supports another device to perform processes of allowing the labeler to compare each degree of the de-identification for each of the de-identified images with one or more predetermined de-identification criteria, wherein at least one of a predetermined noise level, a predetermined entropy level or a possibility of detecting objects acts as the predetermined de-identification criteria, and thus allowing the labeler to (i) classify first certain de-identified images as the positive samples if first certain degrees of de-identification for the first certain de-identified images satisfy the predetermined de-identification criteria, and (ii) classify second certain de-identified images as the negative samples if second certain degrees of de-identification for the second certain de-identified images do not satisfy the predetermined de-identification criteria.

5. The method of claim 4, wherein the learning device performs or supports another device to perform processes of allowing the labeler to (i) acquire each specific noise level for each of the de-identified images as each degree of the de-identification for each of the de-identified images and classify the first certain de-identified images, whose specific noise levels are higher than or equal to the predetermined noise level, as the positive samples, (ii) acquire each specific entropy level for each of the de-identified images as each degree of the de-identification for each of the de-identified images and classify the first certain de-identified images, whose specific entropy levels are higher than or equal to the predetermined entropy level, as the positive samples, and (iii) acquire each specific object detection result for each of the de-identified images as each degree of the de-identification for each of the de-identified images in order to determine the possibility of detecting objects, and classify the first certain de-identified images, whose specific object detection results show no objects detected, as the positive samples.

6. A method for training an obfuscation network capable of obfuscating images, comprising steps of:
 (a) in response to acquiring a first original image, a first learning device performing or supporting another device to perform processes of inputting the first original image to an obfuscation network, and allowing the obfuscation network to obfuscate the first original image to thereby generate a first obfuscated image corresponding to the first original image;
 (b) the first learning device performing or supporting another device to perform processes of (i) (i-1) inputting the first obfuscated image into a surrogate network having at least one or more trained parameters, and allowing the surrogate network to apply at least one learning operation to the first obfuscated image by using the trained parameters and thus to generate characteristic information corresponding to the first obfuscated image, and (i-2) generating an accuracy loss by referring to the characteristic information and its corresponding ground truth or by referring to a specific task output and its corresponding ground truth, wherein the task specific output is generated by using the characteristic information, (ii) inputting the first obfuscated image to a universal discriminator, having been trained by a second learning device such that the universal discriminator generates discriminant scores corresponding to images inputted thereto according to each degree of de-identification for each of the images, and allowing the universal discriminator to generate a first discriminant score corresponding to the first obfuscated image according to a degree of the de-identification for the first obfuscated image, and (iii) inputting the first obfuscated image to a regular discriminator and allowing the regular discriminator to generate a second discriminant score corresponding to the first obfuscated image by determining whether the first obfuscated image is real or fake; and
 (c) the first learning device performing or supporting another device to perform processes of training the obfuscation network such that the accuracy loss is minimized and such that the first discriminant score and the second discriminant score are maximized.

7. The method of claim 6, wherein, while the first learning device performs or supports another device to perform processes of training the obfuscation network such that the accuracy loss is minimized and the first discriminant score and the second discriminant score are maximized, the first learning device further performs or further supports another device to perform processes of (i) inputting the first obfuscated image to the regular discriminator and allowing the regular discriminator to generate the second discriminant score corresponding to the first obfuscated image by determining whether the first obfuscated image is real or fake, and (ii) (ii-1) inputting one of the first original image, a modified original image generated by modifying the first original image and a modified obfuscated image generated by modifying the first obfuscated image to the regular discriminator, (ii-2) allowing the regular discriminator to generate a third discriminant score corresponding to said one of the first original image, the modified original image and the modified obfuscated image by determining whether said one of the first original image, the modified original image the the modified obfuscated image is real or fake, and thus (ii-3) training the regular discriminator such that the second discriminant score is minimized and the third discriminant score is maximized.

8. The method of claim 6, wherein, the surrogate network includes a 1-st surrogate network to an n-th surrogate network respectively having one or more 1-st trained parameters to one or more n-th trained parameters wherein n is an integer equal to or larger than 1, and
 wherein the first learning device performs or supports another device to perform processes of (i) inputting the first obfuscated image to each of the 1-st surrogate network to the n-th surrogate network and allows each of the 1-st surrogate network to the n-th surrogate network to apply its corresponding learning operation to the first obfuscated image by respectively using the 1-st trained parameters to the n-th trained parameters to thereby generate 1-st characteristic information to n-th characteristic information, and (ii) generating the accuracy loss by averaging a 1-st accuracy loss to an n-th accuracy loss, wherein each of the 1-st accuracy loss to the n-th accuracy loss is generated by referring to each of the 1-st characteristic information to the n-th characteristic information and its corresponding ground truth or by referring to each of a 1-st task specific output to an n-th task specific output, generated by using each of the 1-st characteristic information to the n-th characteristic information, and its corresponding ground truth.

9. The method of claim 6, wherein the universal discriminator has been trained by the second learning device such that the universal discriminator generates the discriminant scores corresponding to the images inputted thereto according to each degree of the de-identification for each of the images, and
 wherein the second learning device performs or supports another device to perform processes of (i) transmitting de-identified images to at least one labeler and allowing the labeler to classify the de-identified images into positive samples or negative samples according to each degree of the de-identification for each of the de-identified images, wherein a positive reference value is labelled as ground truth for the positive samples and a negative reference value is labelled as ground truth for the negative samples, (ii) inputting each of the positive samples and each of the negative samples to the universal discriminator, and allowing the universal discriminator to generate each of 4-th discriminant scores corresponding to each of the positive samples and each of the negative samples according to each degree of the de-identification for each of the positive samples and each of the negative samples, and (iii) generating discriminator losses by comparing the 4-th discriminant scores for each of the positive samples and each of the negative samples with their corresponding ground truths, and thus training the universal discriminator such that the discriminator losses are minimized.

10. The method of claim 9, wherein the de-identified images include anonymized images generated by applying at least one anonymization process, including at least one of blurring, noise addition, resolution changes, color changes and mosaic processing, to second original images, different from the first original image.

11. The method of claim 9, wherein the de-identified images include second obfuscated images generated by an obfuscation network in a training state or an obfuscation network in a trained state, wherein the obfuscation network in the training state and the obfuscation network in the trained state obfuscate each of second original images, different from the first original image, such that each of the second obfuscated images is made not identifiable as each of its corresponding second original images with naked eyes but is made identifiable as each of its corresponding second original images by a deep-learning based surrogate network.

12. A learning device for training a universal discriminator capable of determining each degree of de-identification for each image, comprising:
at least one memory that stores instructions; and
at least one processor configured to execute the instructions to perform or support another device to perform:
(I) processes of (i) transmitting de-identified images to at least one labeler, wherein the de-identified images are generated by de-identifying original images, and (ii) allowing the labeler to classify the de-identified images into positive samples or negative samples according to each degree of the de-identification for each of the de-identified images, wherein a positive reference value is labelled as ground truth for the positive samples and a negative reference value is labelled as ground truth for the negative samples, (II) processes of inputting each of the positive samples and each of the negative samples to the universal discriminator, and allowing the universal discriminator to generate each of discriminant scores corresponding to each of the positive samples and each of the negative samples according to each degree of the de-identification for each of the positive samples and each of the negative samples, and (III) processes of generating discriminator losses by comparing the discriminant scores for each of the positive samples and each of the negative samples with their corresponding ground truths, and thus training the universal discriminator in a direction of minimizing the discriminator losses.

13. The learning device of claim 12, wherein, at the process of (I), the de-identified images include anonymized images generated by applying at least one anonymization process, including at least one of blurring, noise addition, resolution changes, color changes and mosaic processing, to the original images.

14. The learning device of claim 12, wherein, at the process of (I), the de-identified images include obfuscated images generated by an obfuscation network in a training state or an obfuscation network in a trained state, wherein the obfuscation network in the training state and the obfuscation network in the trained state obfuscate each of the original images such that each of the obfuscated images is made not identifiable as each of its corresponding original images with naked eyes but is made identifiable as each of its corresponding original images by a deep-learning based surrogate network.

15. The learning device of claim 12, wherein, at the process of (I), the processor performs or supports another device to perform a process of allowing the labeler to compare each degree of the de-identification for each of the de-identified images with one or more predetermined de-identification criteria, wherein at least one of a predetermined noise level, a predetermined entropy level or a possibility of detecting objects acts as the predetermined de-identification criteria, and thus allowing the labeler to (i) classify first certain de-identified images as the positive samples if first certain degrees of de-identification for the first certain de-identified images satisfy the predetermined de-identification criteria, and (ii) classify second certain de-identified images as the negative samples if second certain degrees of de-identification for the second certain de-identified images do not satisfy the predetermined de-identification criteria.

16. The learning device of claim 15, wherein the processor performs or supports another device to perform processes of allowing the labeler to (i) acquire each specific noise level for each of the de-identified images as each degree of the de-identification for each of the de-identified images and classify the first certain de-identified images, whose specific noise levels are higher than or equal to the predetermined noise level, as the positive samples, (ii) acquire each specific entropy level for each of the de-identified images as each degree of the de-identification for each of the de-identified images and classify the first certain de-identified images, whose specific entropy levels are higher than or equal to the predetermined entropy level, as the positive samples, and (iii) acquire each specific object detection result for each of the de-identified images as each degree of the de-identification for each of the de-identified images in order to determine the possibility of detecting objects, and classify the first certain de-identified images, whose specific object detection results show no objects detected, as the positive samples.

17. A first learning device for training an obfuscation network capable of obfuscating images, comprising:
at least one memory that stores instructions; and
at least one processor configured to execute the instructions to perform or support another device to perform:
(I) in response to acquiring a first original image, processes of inputting the first original image to an obfuscation network, and allowing the obfuscation network to obfuscate the first original image to thereby generate a first obfuscated image corresponding to the first original image, (II) processes of (i) (i-1) inputting the first obfuscated image into a surrogate network having at least one or more trained parameters, and allowing the surrogate network to apply at least one learning operation to the first obfuscated image by using the trained parameters and thus to generate characteristic information corresponding to the first obfuscated image, and (i-2) generating an accuracy loss by referring to the characteristic information and its corresponding ground truth or by referring to a specific task output and its corresponding ground truth, wherein the task specific output is generated by using the characteristic information, (ii) inputting the first obfuscated image to a universal discriminator, having been trained by a second learning device such that the universal discriminator generates discriminant scores corresponding to images inputted thereto according to each degree of de-identification for each of the images, and allowing the universal discriminator to generate a first discriminant score corresponding to the first obfuscated image according to a degree of the de-identification for the first obfuscated image, and (iii) inputting the first obfuscated image to a regular discriminator and allowing the regular discriminator to generate a second discriminant score corresponding to the first obfuscated image by determining whether the first obfuscated image is real or fake, and (III) processes of training the obfuscation network such that the accuracy loss is minimized and such that the first discriminant score and the second discriminant score are maximized.

18. The first learning device of claim 17, wherein, while processor performs or supports another device to perform the processes of training the obfuscation network such that the accuracy loss is minimized and the first discriminant score and the second discriminant score are maximized, the processor further performs or further supports another device to perform processes of (i) inputting the first obfuscated image to the regular discriminator and allowing the regular discriminator to generate the second discriminant score corresponding to the first obfuscated image by determining whether the first obfuscated image is real or fake, and (ii) (ii-1) inputting one of the first original image, a modified original image generated by modifying the first original image and a modified obfuscated image generated by modifying the first obfuscated image to the regular discriminator, (ii-2) allowing the regular discriminator to generate a third discriminant score corresponding to said one of the first original image, the modified original image and the modified obfuscated image by determining whether said one of the first original image, the modified original image the the modified obfuscated image is real or fake, and thus (ii-3) training the regular discriminator such that the second discriminant score is minimized and the third discriminant score is maximized.

19. The first learning device of claim 17, wherein, the surrogate network includes a 1-st surrogate network to an n-th surrogate network respectively having one or more 1-st trained parameters to one or more n-th trained parameters wherein n is an integer equal to or larger than 1, and
    wherein the processor performs or supports another device to perform processes of (i) inputting the first obfuscated image to each of the 1-st surrogate network to the n-th surrogate network and allows each of the 1-st surrogate network to the n-th surrogate network to apply its corresponding learning operation to the first obfuscated image by respectively using the 1-st trained parameters to the n-th trained parameters to thereby generate 1-st characteristic information to n-th characteristic information, and (ii) generating the accuracy loss by averaging a 1-st accuracy loss to an n-th accuracy loss, wherein each of the 1-st accuracy loss to the n-th accuracy loss is generated by referring to each of the 1-st characteristic information to the n-th characteristic information and its corresponding ground truth or by referring to each of a 1-st task specific output to an n-th task specific output, generated by using each of the 1-st characteristic information to the n-th characteristic information, and its corresponding ground truth.

20. The first learning device of claim 17, wherein the universal discriminator has been trained by the second learning device such that the universal discriminator generates the discriminant scores corresponding to the images inputted thereto according to each degree of the de-identification for each of the images, and
    wherein the processor performs or supports another device to perform processes of (i) transmitting de-identified images to at least one labeler and allowing the labeler to classify the de-identified images into positive samples or negative samples according to each degree of the de-identification for each of the de-identified images, wherein a positive reference value is labelled as ground truth for the positive samples and a negative reference value is labelled as ground truth for the negative samples, (ii) inputting each of the positive samples and each of the negative samples to the universal discriminator, and allowing the universal discriminator to generate each of 4-th discriminant scores corresponding to each of the positive samples and each of the negative samples according to each degree of the de-identification for each of the positive samples and each of the negative samples, and (iii) generating discriminator losses by comparing the 4-th discriminant scores for each of the positive samples and each of the negative samples with their corresponding ground truths, and thus training the universal discriminator such that the discriminator losses are minimized.

21. The first learning device of claim 20, wherein the de-identified images include anonymized images generated by applying at least one anonymization process, including at least one of blurring, noise addition, resolution changes, color changes and mosaic processing, to second original images, different from the first original image.

22. The first learning device of claim 20, wherein the de-identified images include second obfuscated images generated by an obfuscation network in a training state or an obfuscation network in a trained state, wherein the obfuscation network in the training state and the obfuscation network in the trained state obfuscate each of second original images, different from the first original image, such that each of the second obfuscated images is made not identifiable as each of its corresponding second original images with naked eyes but is made identifiable as each of its corresponding second original images by a deep-learning based surrogate network.

* * * * *